D. T. TIMBERLAKE.
VEHICLE WHEEL.
APPLICATION FILED JAN. 2, 1912.
1,084,302.
Patented Jan. 13, 1914.
2 SHEETS—SHEET 1.
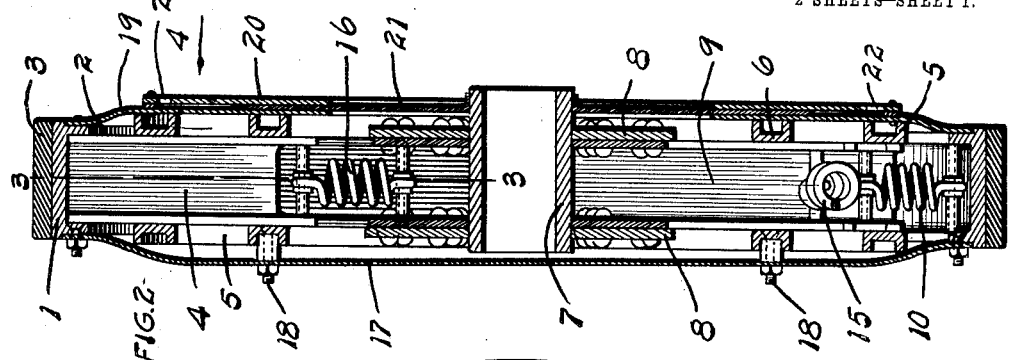
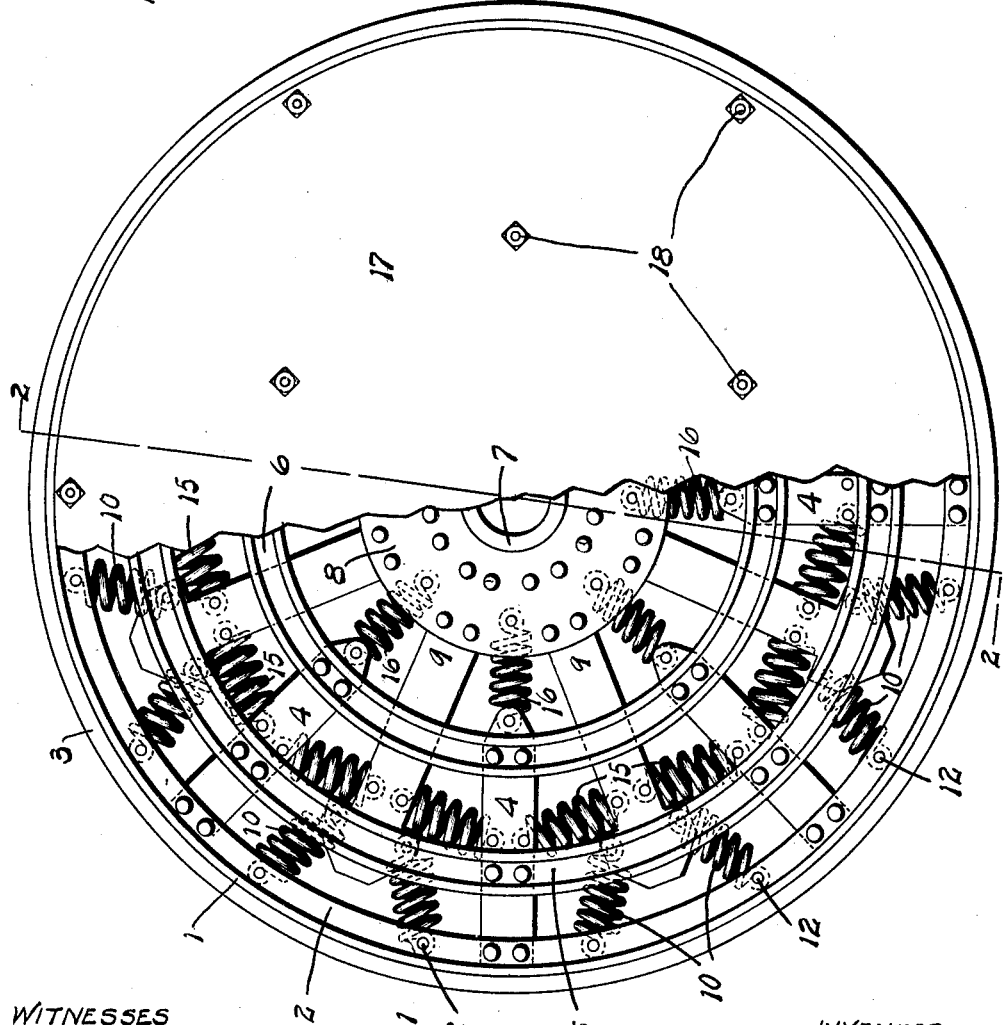
WITNESSES
INVENTOR
DANIEL T. TIMBERLAKE D. T. TIMBERLAKE.
VEHICLE WHEEL.
APPLICATION FILED JAN. 2, 1912.
1,084,302.
Patented Jan. 13, 1914.
2 SHEETS—SHEET 2.
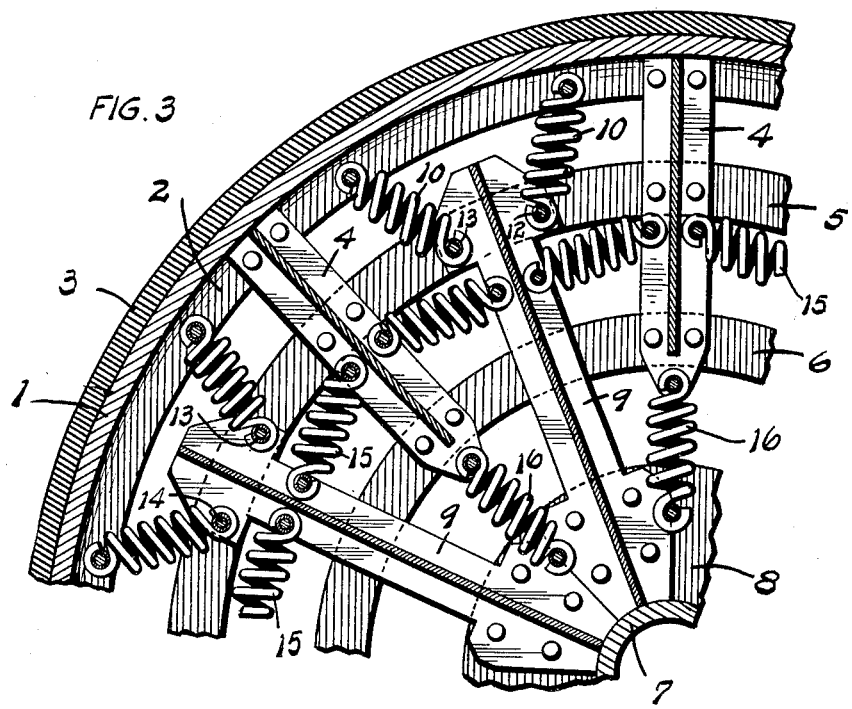
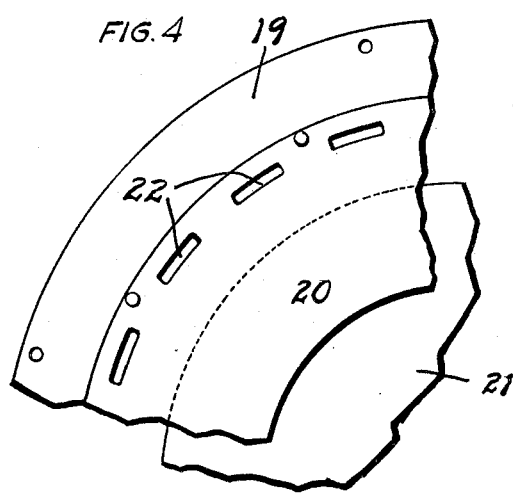
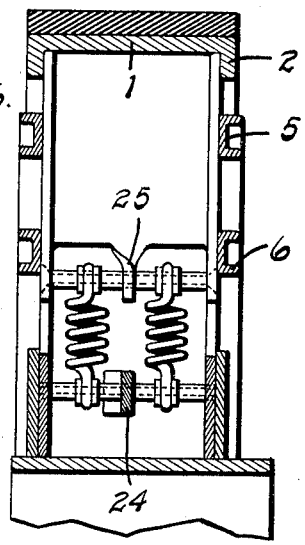
WITNESSES
INVENTOR
DANIEL T. TIMBERLAKE
BY ATT'Y.

UNITED STATES PATENT OFFICE.

DANIEL T. TIMBERLAKE, OF ST. LOUIS, MISSOURI, ASSIGNOR OF ONE-HALF TO WALTER E. HOSCH, OF ST. LOUIS, MISSOURI.

VEHICLE-WHEEL.

1,084,302.  Specification of Letters Patent.  Patented Jan. 13, 1914.

Application filed January 2, 1912. Serial No. 668,987.

*To all whom it may concern:*

Be it known that I, DANIEL T. TIMBERLAKE, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same, reference being had to the accompanying drawings, forming part of this specification, in which—

Figure 1 is a side elevation of a vehicle wheel of my improved construction with parts broken away in order to clearly illustrate the construction on the interior of the wheel. Fig. 2 is a vertical section taken approximately on the line 2—2 of Fig. 1. Fig. 3 is an enlarged detail section taken approximately on the line 3—3 of Fig. 2. Fig. 4 is an enlarged detail elevational view taken looking in the direction indicated by the arrow 4 in Fig. 2. Fig. 5 is a detail section illustrating the means employed for connecting the ends of the springs to the transverse rods or pins. Fig. 6 is a detail sectional view of a modified form of the wheel.

My invention relates to a wheel particularly intended for use upon motor vehicles and the like, the principal object of my invention being to construct a wheel having a yielding resilient connection between the rim and the hub whereby the jar and vibration incident to the wheel traveling over a roadway will be almost entirely absorbed within the wheel instead of being transmitted to the vehicle and its load.

A further object of my invention is to construct a wheel which is, with the exception of a solid rubber or leather tire, all metal and to utilize and arrange a series of springs within the wheel between the rim and the hub so as to provide a wheel which possesses all the desirable characteristics of a pneumatic tire type of wheel without the many disadvantages and expense incident to the use of pneumatic tires.

A further object of my invention is to produce a wheel which can be advantageously used upon heavy motor trucks and comparatively heavy vehicles now in general use in heavy hauling, and which wheel is characterized by great resiliency, strength and durability, and which wheel can be cheaply manufactured and kept in repair with comparatively little expense.

To the above purposes my invention consists in certain novel features of construction and arrangement of parts hereinafter more fully described and claimed.

Referring by numerals to the accompanying drawings: 1 designates the rim of my improved wheel which is in the form of a solid ring provided at its sides with inwardly projecting flanges 2, and if desired, a solid tire 3 of rubber, leather or suitable composition may be applied to the periphery of said rim.

4 designates radially arranged arms which are preferably of I-beam shape in cross section, and the outer ends of these arms are rigidly fixed in any suitable manner to the flanges 2 of the rim. Fixed to the sides of the arms 4 a short distance inside the rim 1 are concentric rings 5 and a pair of similar concentric rings 6 are fixed to the arms 4 adjacent to their inner ends.

The hub of my improved wheel comprises a tubular body portion 7 to which is fixed a pair of circular plates 8, and fixed to these plates in any suitable manner are the inner ends of a series of spokes 9 which are preferably of I-beam shape in cross section with their outer ends terminating adjacent to the concentric rings 5. The outer end of each spoke 9 is yieldingly connected to the rim 1 by means of a pair of short retractile coil springs 10, the outer ends of which springs are looped around the central portions of tubes 11, which latter are loosely mounted upon pins 12, the outer ends of which are seated in the flanges 2 (see Fig. 5). The inner ends of these springs 10 are looped around tubes 13, which latter are loosely mounted on pins 14, the ends of which are seated in the flanges of the spokes 9.

The outer portions of the spokes 9 are yieldingly connected to the central portions of the arms 4 by short retractile coil springs 15, the ends of which are looped around tubes loosely mounted on transverse pins, and which construction is the same as employed in attaching the ends of the springs 10, heretofore described.

The inner ends of the arms 4 are yieldingly connected to the hub of the wheel by short retractile coil springs 16, the ends of which are looped around tubes loosely mounted on pins which latter are seated in the hub and in the inner ends of the arms 4, and which construction is the same as the construction utilized in attaching the springs 10 and 15. Thus it will be seen that the hub carrying the spokes 9 is yieldingly supported in the framework of the wheel and which frame work comprises the rim 1, the concentric rings 5 and 6 and the radially disposed arms 4. The hub, which receives the spindle of the axle is arranged to move vertically or horizontally with respect to the frame of the wheel and vice versa, and when any movement of either part takes place, the various retractile springs are thrown into action, thus yieldingly and resiliently opposing the movement of one part with respect to the other, and as a result, all shocks and vibrations resulting from the traveling of the tire or rim of the wheel upon uneven ground are absorbed by said springs and are therefore prevented from being transmitted to the body of the vehicle and its load.

A solid sheet metal plate 17 is applied to one side of the wheel, and is fixed in position by means of bolts or rivets 18, which latter are seated in the corresponding one of the flanges 2 and either one of the corresponding concentric rings 5 or 6. On the opposite side of the wheel a ring 19 of sheet metal is attached at its outer edge of the corresponding one of the flanges 2 and applied to the outer face of this ring 19 and spaced apart therefrom is a ring 20. A sheet metal plate 21 is fixed on the corresponding end of the tubular portion 7 of the hub and the outer portion of this plate 21 occupies a position between the inner portions of the rings 19 and 20.

During the movement of the hub with respect to the body or rim of the wheel the outer portion of the plate 21 slides between the rings 19 and 20, and should any water or dirt pass through the joint between the rings 19 and 20 and plate 21, it will find exit through openings 22 formed through the outer ring 20 adjacent to its outer edge.

In Fig. 6 I have illustrated a modified form of wheel which has extra width and is adapted for use on vehicles engaged in heavy hauling. In this construction the arms 4 and spokes 9 are of extra width, and the coil springs are arranged in pairs at the various points of connection between the spokes 9 and the rim 1 and arms 4 and between the inner ends of said arms 4 and the hub. This construction requires twice the number of springs used in the construction shown in Figs. 1, 2 and 3 and where a larger number of springs are used it necessarily follows that the wheel will take care of heavier loads.

Where wheels of extra width are constructed it is necessary to support the central portions of the pins which carry the ends of the springs and said pins can be supported in any suitable manner, preferably by means of ears 24 and 25 which project from the parts upon which the pins are carried.

A wheel of my improved construction is, with the exception of the tire, all metal, can be cheaply manufactured for the reason that no expensive castings or special shapes are employed, and all of the springs utilized are of the same size and they can be replaced with comparatively little expense when they have become broken or unfit for service. The springs utilized in the wheel are comparatively short and can therefore be cheaply manufactured, and as a large number of springs are utilized in the construction of a complete wheel, said wheel will remain in serviceable condition even though several of said springs be broken.

A wheel of my improved construction has great strength, is comparatively light in weight, has great resiliency, can be kept in repair with comparatively little expense and can be made in various sizes to suit different requirements. The hub portion of the wheel is yieldingly mounted with respect to the rim portion of the wheel, and this construction eliminates all jar and vibration which would otherwise be transmitted to the load during the passage of the wheel over rough or uneven ground.

It will be readily understood that minor changes may be made in the size, form and construction of the various parts of my improved wheel without departing from the spirit of my invention, the scope of which is set forth in the appended claims.

I claim:

1. In a vehicle wheel, a rim, a series of radially arranged arms projecting inwardly from said rim, a pair of concentric rings fixed to both sides of said arms, a hub, a series of radially arranged spokes fixed to said hub and extending between the arms, the sides of which spokes fit snugly against the inner faces of the concentric rings, and a plurality of comparatively short coil springs attached to and arranged between the spokes and the inwardly projecting arms, and a pair of comparatively short coil springs connecting the outer end of each spoke with the wheel rim.

2. In a vehicle wheel a rim, a series of radially arranged inwardly projecting arms fixed to said rim, concentric rings fixed to the sides of said arms, a hub, a series of radially arranged spokes fixed to said hub and extending between the arms and the concentric rings and a pair of coil springs forming a connection between the spokes and the inwardly projecting arms and which coil springs are arranged substantially at right angles to the spokes and arms to which they are connected.

3. In a vehicle wheel a rim, a series of radially arranged arms projecting inwardly therefrom, concentric rings fixed to the sides of said arms, a hub, a series of radially arranged spokes fixed to the hub and extending between the arms and the concentric rings, a pair of coil springs forming a connection between the outer end of each spoke and the rim the members of which pairs of coil springs diverge with respect to each other from the outer ends of the spokes to the points where said springs are attached to the rim and pairs of coil springs forming a connection between the outer portion of the spokes and the inwardly projecting arms.

4. In a vehicle wheel, an inner member comprising a hub and radially arranged spokes, an outer member comprising a rim and a series of inwardly projecting arms carried thereby, which arms occupy positions between the spokes, springs connected to and arranged between the inner ends of the arms and the hub, a pair of springs connected to each spoke and to the adjacent arms which last mentioned springs are arranged substantially at right angles to the spokes to which they are attached, and a pair of springs between the outer end of each spoke and the rim, which last mentioned springs are inclined relative to the spoke to which they are attached.

5. In a vehicle wheel, a rim, a series of radially arranged arms projecting inwardly from the rim, a hub, a series of radially arranged spokes projecting outwardly from the hub between the arms, a pair of diverging coil springs attached to and forming a connection between the outer end of each spoke and the rim, a single coil spring attached to and forming a connection between the inner end of each inwardly projecting arm and the hub, and means fixed to the sides of the inwardly projecting arms for maintaining the hub and spoke portion of the wheel in operative relation to the rim and arm portion.

In testimony whereof I hereunto affix my signature in the presence of two witnesses, this 28th day of December, 1911.

DANIEL T. TIMBERLAKE.

Witnesses:
M. P. SMITH,
LILY ROST.

---

Copies of this patent may be obtained for five cents each, by addressing the "Commissioner of Patents, Washington, D. C."